April 13, 1926. 1,580,501
V. LAMBERT
LIQUID MEASURING DEVICE
Filed Dec. 21, 1923 2 Sheets-Sheet 1
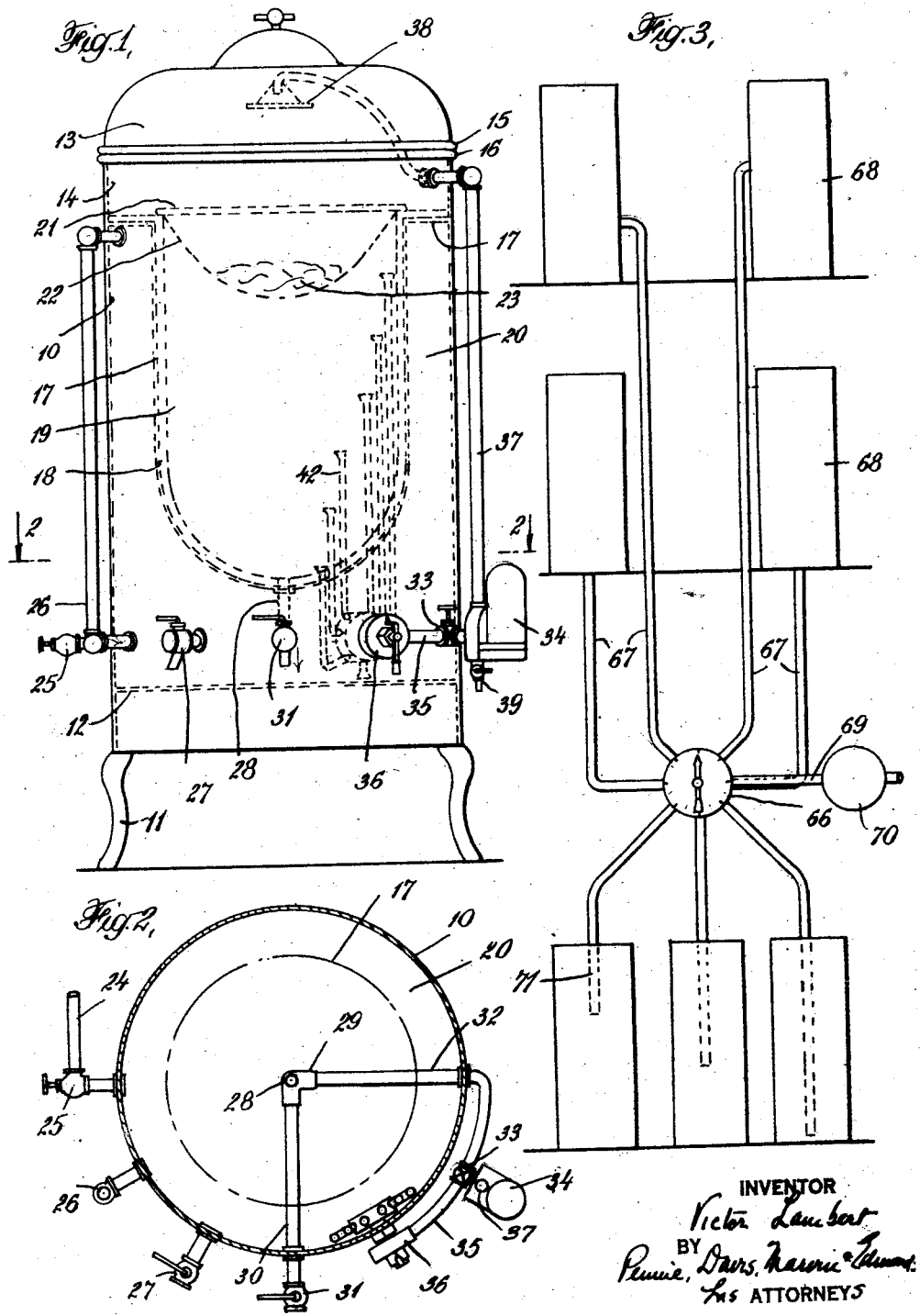

April 13, 1926.  
V. LAMBERT  
LIQUID MEASURING DEVICE  
Filed Dec. 21, 1923  2 Sheets-Sheet 2  
1,580,501
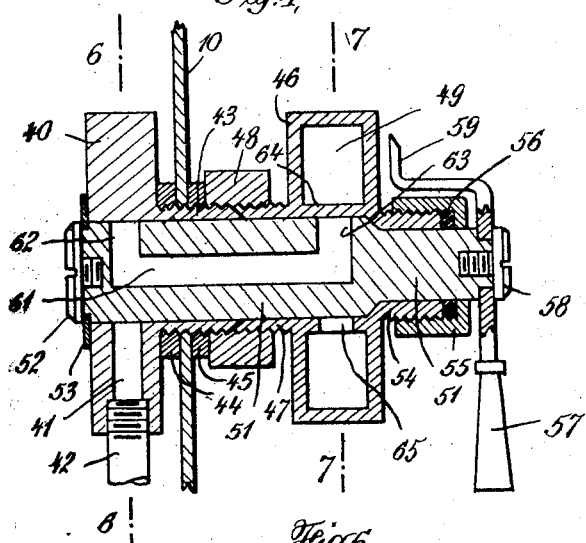
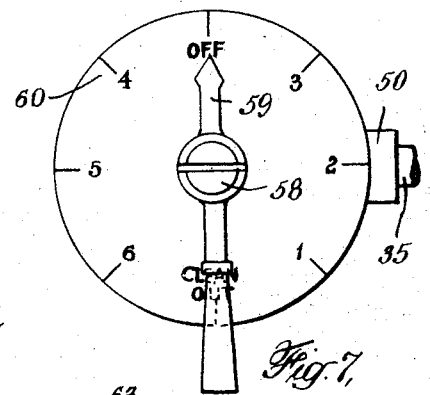
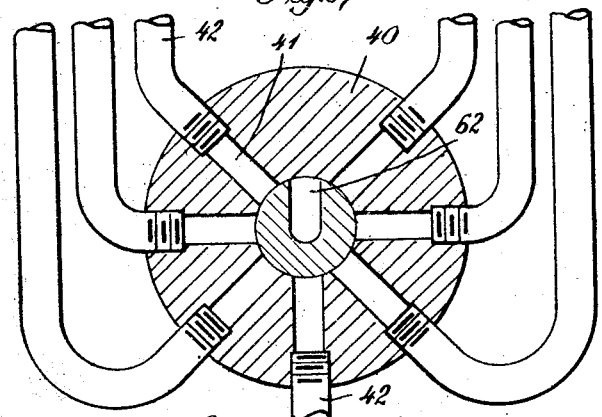
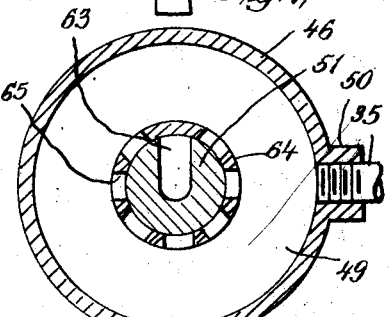
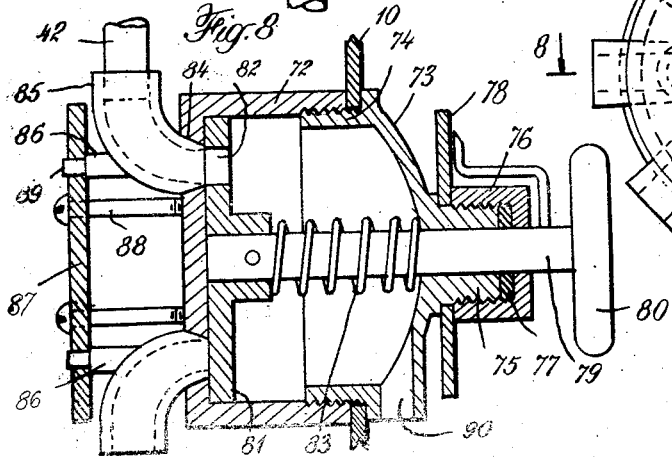
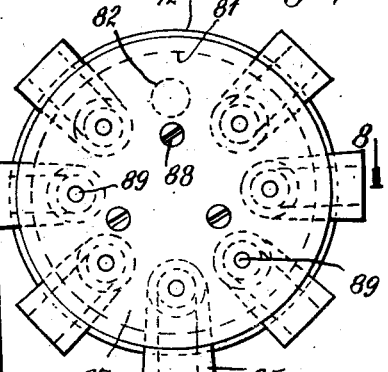
INVENTOR  
Victor Lambert  
BY  
Pennie, Davis, Marvin & Edmonds  
his ATTORNEYS Patented Apr. 13, 1926.

1,580,501

UNITED STATES PATENT OFFICE.

VICTOR LAMBERT, OF BROOKLYN, NEW YORK, ASSIGNOR TO AARON M. SLOSS, OF NEW YORK, N. Y.

LIQUID-MEASURING DEVICE.

Application filed December 21, 1923. Serial No. 681,923.

*To all whom it may concern:*

Be it known that I, VICTOR LAMBERT, a citizen of the United States, residing at Brooklyn, in the county of Kings and State of New York, have invented certain new and useful Improvements in Liquid-Measuring Devices; and I do hereby declare the following to be a full, clear, and exact description of the invention, such as will enable others skilled in the art to which it appertains to make and use the same.

This invention relates to liquid measuring devices and has to do more particularly with a measuring device by which predetermined quantities of liquid may be drawn from a tank. This measuring device is peculiarly adapted for use in connection with coffee urns and will be described in such adaptation, although the device is suitable for use in many other connections which will be pointed out later.

Coffee urns such as are in wide use at the present time in restaurants and hotels ordinarily consist of a casing in which there are two compartments formed by a suitable partition. One of these compartments contains water which is heated by a suitable burner below the end of the casing, and the other compartment is to contain the coffee. Near its upper end the second compartment carries a bag in which the ground coffee is placed, and when coffee is to be made water is removed from the water compartment and introduced into the coffee compartment through the ground coffee. The water passing once through the ground coffee does not make the coffee liquid of sufficient strength and the coffee compartment therefore has an outlet from which the liquid may be withdrawn and poured again through the ground coffee. This percolation of the coffee through the grains is repeated as many times as may be desired.

With these urns there is made initially a measured amount of coffee, as for instance, five gallons, although this will depend on the size of the urn. After the coffee is made and has been withdrawn from time to time from the coffee compartment, as it is served, it is desirable that water which is used to replace the contents of the coffee compartment should be measured as it is introduced therein. Also it is desirable that this measuring device should be operable in such a way that the quantities so withdrawn from the water compartment may be measured regardless of the water level in that compartment, since otherwise if it were necessary to restore the water level therein after each withdrawal, the temperature of the water would be considerably lowered and it would be necessary to raise this water to a boiling temperature before it could be used for coffee making.

The present invention is directed to the provision of a measuring device which is peculiarly adapted for this purpose, although it may be used in various other connections as will presently be described. This device consists of a valve having a single discharge outlet and a plurality of inlets, any one of which may be connected to the outlet while the others are cut off. The valve with its inlets is placed in the water compartment of the urn and connected to the inlets are pipes of different heights which extend vertically in the urn. The urn is provided with the usual gauge device by which the water level may be ascertained, and the ends of the pipes are located so that the amount of liquid which lies between the end of any pipe and the normal water level of the compartment will be a definite quantity. With this arrangement when it is desired to withdraw a given amount of water from the compartment for coffee making purposes, the pipe which corresponds to that amount is connected through the valve to the outlet. This quantity is then withdrawn and poured or otherwise discharged into the coffee compartment through the grains of coffee. After this quantity of liquid has been withdrawn, the liquid level in the compartment will lie at the same height as the end of this pipe, and the other pipes are of sufficient length that the differences in their heights will correspond to definite quantities of liquid. Consequently if a further measured quantity of liquid is to be removed the proper pipe will be connected to the outlet. A dial is provided so that the amount of liquid which may be withdrawn through any pipe will be indicated thereon It will be seen that the device may be used for withdrawing a series of measured quantities from the water compartment without making it necessary to restore the level therein to its original or normal level and, therefore, the operation of the urn is greatly improved since water may be withdrawn therefrom at any time with the assurance that this water is at the proper temperature for coffee making. When nearly all of the water is withdrawn from the water compartment it must be filled again, but this occurs only at infrequent intervals.

While the device, as will be seen, is capable of use for withdrawing measured quantities from a vessel in the manner described, it is also possible to make use of it for providing a common discharge valve from a series of vessels. In the form which will presently be described there are seven inlet pipes, any one of which may be connected as may be desired to the outlet. Therefore, this device may be used with a number of vessels up to seven, from each of which liquid may be withdrawn in turn, as required. In this latter use the device may not only serve the purpose of a common discharge valve for a plurality of vessels, but it is possible to combine its two functions and provide outlets from a series of vessels, from each of which a definite measured quantity of liquid may be withdrawn at any desired time. These various functions of the device will be described and made clear hereinafter.

In the accompanying drawings the device has been illustrated in that form which is now considered preferable, and in these drawings:

Fig. 1 is a side elevation of a coffee urn with the measuring device in place therein, Fig. 2 is a sectional view of this urn on the line 2—2 of Fig. 1, Fig. 3 is a diagrammatic view of the device used in connection with a plurality of vessels, Fig. 4 is a longitudinal sectional view of the device, Fig. 5 is a front end view, Fig. 6 is a sectional view on the line 6—6 of Fig. 4, Fig. 7 is a sectional view on the line 7—7 of Fig. 4, Fig. 8 is a sectional view of a modification on the line 8—8 of Fig. 9, and Fig. 9 is a rear view of this modification.

Referring to the drawings, the urn is seen to consist of a casing 10, ordinarily of cylindrical form and made of a non-corrodible metal. This casing is mounted on suitable legs 11 at any convenient location, as for instance, on the counter of a restaurant. The casing is provided with a bottom 12, placed a short distance inwardly from its lower end, and below this bottom is located the heating burner which is not illustrated. The top of the casing is provided with a removable cover 13 which has a flange 14 fitting down within the casing, and a bead 15 which rests on a bead 16 at the top edge of the casing.

Secured to the inner wall of the casing, near its upper end is a partition 17, having a central depression in which is fitted a liner 18, made of porcelain or other vitreous material. This partition, with its liner, forms the coffee compartment 19 around which extends the water compartment 20. Resting on the top of the lining is a ring 21 secured to which is a fabric bag 22 in which the coffee grounds 23 are placed. This ring with the bag is not secured to the lining, and may be readily removed therefrom when it is desired to place fresh grounds within it.

An inlet pipe 24 is connected through a valve 25 with the lower end of the water compartment, and there is also provided a gauge device 26 of the usual construction connected near the bottom and the top of the water compartment and serving to indicate the height of the water therein. The water compartment is also provided with a draw-off valve 27 near its lower end.

The bottom of the coffee compartment is provided with an outlet pipe 28 at the end of which is a three-way connection 29. One branch of this connection is connected with a pipe 30 which extends outwardly through the casing of the urn to a valve 31 through which the coffee is drawn off from time to time as may be needed. The other branch of the connection 29 is connected to a pipe 32 which passes outwardly through the wall of the casing and is there connected to a three-way valve 33. One branch of this connection communicates with a pump 34 which may either be hand or motor operated. The other outlet of the valve 33 is connected to a pipe 35 which is, in turn, connected to the measuring device 36. Extending upwardly from the pump is a pipe 37 which at its upper end extends inwardly through the wall of the casing and is connected to a discharge nozzle 38 disposed centrally of the urn above the coffee compartment. The pump is provided with a draw-off valve 39.

In the operation of the urn water is led into the water compartment through the intake to the desired height as indicated in the gauge device. The burner is then lighted and this water is heated. The ground coffee is placed in the bag which is, in turn, mounted on the top of the lining and when the water has reached the proper temperature the valve 33 is opened and a quantity of water is drawn off through the measuring device the construction of which will presently be explained. This water from the measuring device is then led into the pump and pumped upwardly through the pipe 37 and discharged through the nozzle 38. The water flows downwardly, percolating through the coffee. When the desired amount of water has thus been introduced into the coffee compartment through the measuring device the latter is shut off and the valve 33 is also adjusted so that the pipe 32 is now in communication with the pump. The latter is again operated and draws off the liquid which has collected in the bottom of the coffee compartment and pumps it up again through the nozzle 38 causing a second percolation. This latter process is repeated as may times as may be necessary to make coffee of the desired strength. As the coffee is withdrawn from the discharge valve 31 water is occasionally introduced into the coffee compartment and the process of percolation is carried on as described.

The measuring device by which the water is withdrawn from the water compartment and introduced into the coffee compartment is illustrated in position in the urn in Fig. 1 and is shown elsewhere in the drawings in sectional views.

This valve consists of a block 40 which is circular in form and provided with a series of passages 41 located radially in it. There are seven of these passages illustrated and connected with each passage is a pipe 42 threaded in the block. These pipes extend upwardly to different heights as illustrated in Fig. 1. The block is mounted in an aperture through the casing and has a sleeve 43 which extends therethrough. Between the block and the casing is a washer 44 and outside of the casing around the sleeve is a similar washer 45. A circular housing 46 is located outside the casing and has a sleeve 47 corresponding in diameter to the sleeve 43 extending from one face thereof. The sleeves 43 and 47 are threaded and a nut 48 is threaded on these sleeves and holds the housing and block in position relatively to each other and to the casing. The housing 46 has an annular compartment 49 at one side of which is a boss 50 in which is threaded the pipe 35.

The block 40 is centrally bored and extending through this bore and through the housing 46 is a cylindrical block or stem 51 held in place at the inner end by a nut 52 threaded in the end of the stem 51 and bearing against a packing washer 53 which lies between the nut and the face of the block 40. The stem 51 extends through the housing 46 which at its outer end has a sleeve 54 through which the block extends. A cap nut 55 is threaded on the sleeve 54 and packing 56 is introduced between the end of the sleeve and the nut so as to make a water-tight connection. On the outer end of the block 51 is a handle 57 mounted in place by a nut 58, and terminating in an indicating pointer 59 which cooperates with a scale 60 formed on the outer flat face of the housing 46.

The cylindrical stem 51 has a central passage 61 formed in it, this passage terminating at its rear end in a lateral passage 62 which is so placed that it may be moved into communication with any of the passages 41 through the block. At the other end the passage is in communication with another lateral passage 63 and in the housing there is mounted a bushing 64 having a series of apertures 65 formed therein. This bushing is mounted in the housing so as to enclose the cylindrical block 51 and has a number of apertures 65 formed therethrough and corresponding in angular position to the position of the passages 41 in the block 40. The lateral passage 63 is located in the block in such position that it may be placed in communication with any of these apertures.

When the device is to be used to withdraw liquid from the coffee urn the inlet pipes 42 which are open at their free ends will be disposed in the water compartment of the urn in such position that the tubes lie at calculated heights below the top of the water compartment, or else below some definite liquid level therein. The heights of these inlet pipes will determine the amount of liquid which is to withdrawn since when the valve is open and in connection with any one of these pipes the liquid which will be taken from the water compartment will be that quantity which lies between the liquid level in the compartment and the top of the pipe. The scale 60 will accordingly be calibrated in quantities such as gallons and when the handle 57 is moved to one of the divisions of the scale the cylindrical block 51 will be moved so that the pipe which corresponds to the quantity so indicated will be in communication with the passage 61. The lateral passage 63 will also be placed opposite the desired aperture in the bushing and consequently the quantity of liquid above the end of the pipe selected may be withdrawn from the water compartment through the pump. When this amount of water is withdrawn by the pump and discharged through the discharge orifice no further amount of liquid can be removed by the pump until the liquid level in the compartment has been raised above the end of this inlet pipe. Consequently once the valve is set the pump may be operated and a measured quantity of liquid is delivered without further attention on the part of the operator.

While the measuring device has been explained in connection with a coffee urn it will be seen that it is capable of use for providing a common discharge valve for a series of vessels such as are illustrated in Fig. 3. In this particular application the valve 66 is mounted in a convenient location and the intake pipes 67 are connected with the different vessels 68. The outlet 69 from the valve is connected with a pump 70, although if desired the vessels may be placed in such a location that the liquid will be discharged therefrom by gravity. With this arrangement the handle of the valve may be moved so as to place any selected vessel in communication with the pump so that liquid may be withdrawn therefrom. With this construction the valve performs no measuring function and simply provides a convenient means for discharging the selected liquid into a common outlet. However, if it is desired to combine the two functions it is only necessary to place the intake ends of the pipes 67 in the desired locations within the vessels. For instance, the pipe 71 will withdraw from its vessel only the amount of liquid between its end and the top of the vessel, or the level of the liquid therein. The various other inlet pipes may also be mounted with their ends in different locations in the vessels so that not only is it possible to withdraw liquid from a selected vessel but it is possible with this device to withdraw a certain definite quantity from one vessel and another quantity from another vessel. With such an arrangement as this each vessel will ordinarily be provided with an inlet valve as, for instance, of the float type, which will cause the original liquid level to be restored when the desired quantity has been withdrawn therefrom.

In Figs. 8 and 9 there is illustrated a modified form of construction in which the valve consists of a rear housing 72 and a front housing 73, the two being threaded together as at 74 through an aperture in the wall of the casing 10. The front housing has a boss 75 provided with a cap nut 76 threaded thereon. This cap nut is packed as at 77. Between the boss and the edge of the cap nut is a plate 78 on which a scale similar to the scale 60 is located. Mounted in the boss 75 is a stem 79 on the outer end of which is a handle 80. The inner end of this stem carries a circular plate 81 having an aperture 82 formed therethrough. A spring 83 encircles the stem, and bears at one end against the inner face of the housing 73 and at the other against the plate so as to maintain the plate against the rear face of the housing.

This rear face of the housing has formed in it a series of conical apertures 84 in each of which is mounted an elbow 85 in which is threaded an inlet pipe similar to the inlet pipe 42. Each elbow terminates in a conical end which is adapted to be fitted in the conical seat 84 and each elbow has a stud 86 extending outwardly therefrom. A plate 87 bolted as at 88 to the rear face of the housing 72 is provided with apertures through which reduced portions 89 of the studs 86 are inserted. This plate is drawn inwardly by the bolts and exerts pressure through the studs so as to seat the elbows firmly in the conical recesses.

The housing 73 is provided with a discharge outlet 90 which may be connected to a pipe similar to the pipe 35.

The operation of the device in its modified form of construction is as follows. The pipes 42 of different heights having been threaded in the elbows, the plate 81 is moved by the handle 80 so as to place the aperture 82 opposite the elbow corresponding to the pipe through which the liquid is to be drawn. The liquid may now flow through the elbow into the interior of the housings, and thence outwardly through the outlet 90. This construction may be used either to withdraw measured quantities of liquid from a single tank, or else may be put in communication with a plurality of tanks so as to draw liquid from any one selected for use. That adaptation will be understood from the discussion of such use of the form previously described.

The measuring device has been illustrated and described in connection with the pump and consequently the inlet pipes connected to the device stand vertically and the amount of liquid which is withdrawn is determined by the difference in height of the end of a selected pipe and the level of the liquid in the vessel in which the pipes are mounted. However, it is possible to make use of the device without the pump by employing the siphon principle. For this purpose the measuring device will be located at the top of the water compartment of the urn with the inlet pipes extending downwardly. It will be understood that the water compartment of the urn is completely closed and consequently as the water is heated considerable pressure is generated. This pressure is sufficient so that when the measuring device is adjusted to connect one of the inlets with the discharge pipe the water will be forced upwardly through the selected inlet and thence out through the measuring device through the outlet. The adaptation of the device for this use will amount simply to a reversal of its location and the direction in which the inlet pipes extend. Also, it will be unnecessary now to employ the pump for removing the liquid.

I claim:

1. A coffee urn having a water compartment and a coffee compartment, an outlet from the water compartment, a measuring device disposed within the water compartment and having a connection with the outlet, this device having a plurality of inlets disposed at different heights within the water compartment, and an operating handle for the device disposed outside the water compartment and movable to different positions to connect a selected inlet to the outlet.

2. A coffee urn having a water compartment and a coffee compartment, an outlet from the water compartment, a measuring device disposed within the water compartment and having a connection with the outlet, this device having a plurality of inlets disposed at different heights within the water compartment, an operating handle for the device disposed outside the water compartment and movable to different positions to connect a selected inlet to the outlet, and means for withdrawing water from the water compartment through the measuring device and delivering it to the coffee compartment.

3. A coffee urn having a water compartment and a coffee compartment, an outlet from the water compartment, a measuring device disposed within the water compartment and having a connection with the outlet, this device having a plurality of inlets disposed at different heights within the water compartment, an operating handle for the device disposed outside the water compartment and movable to different positions to connect a selected inlet to the outlet, a line from the outlet terminating in a nozzle discharging into the coffee compartment, and a pump in the line for transferring water through the line from the water compartment to the coffee compartment.

4. A coffee urn comprising the combination of a casing, a partition therein forming a water compartment and a coffee compartment, a block mounted in the wall of the casing and having a plurality of inlet openings, a plurality of pipes connected with these inlet openings and having their open ends located at different heights in the water compartment, a stem rotatably mounted in the block and having a passage therethrough, this stem extending through the wall of the casing, a housing mounted on the outer end of the stem having an outlet, and means operable from the exterior of the casing for connecting a selected inlet with the outlet through the passage.

5. A coffee urn comprising the combination of a casing, a partition therein forming a water compartment and a coffee compartment, a block mounted in the wall of the casing and having a plurality of inlet openings, a plurality of pipes connected with these inlet openings and having their open ends located at different heights in the water compartment, a stem rotatably mounted in the block and having a passage therethrough, this stem extending through the wall of the casing, a housing mounted on the outer end of the stem having an outlet, means operable from the exterior of the casing for connecting a selected inlet with the outlet through the passage, and means outside the urn and connected to the said outlet for pumping water therefrom into the coffee compartment.

6. A coffee urn comprising the combination of a casing, a partition therein forming a water compartment and a coffee compartment, a block mounted in the wall of the casing and having a plurality of inlet openings, a plurality of pipes connected with these inlet openings and having their open ends located at different heights in the water compartment, a stem rotatably mounted in the block and having a passage therethrough, this stem extending through the wall of the casing, a housing mounted on the outer end of the stem having an outlet, means operable from the exterior of the casing for connecting a selected inlet with the outlet through the passage, and a pipe connected with the outlet and leading to the coffee compartment of the urn.

7. A coffee urn comprising the combination of a casing, a partition therein forming a water compartment and a coffee compartment, a block mounted in the wall of the casing and having a plurality of inlet openings, a plurality of pipes connected with these inlet openings and having their open ends located at different heights in the water compartment, a stem rotatably mounted in the block and having a passage therethrough, this stem extending through the wall of the casing, a housing mounted on the outer end of the stem having an outlet, means operable from the exterior of the casing for connecting a selected inlet with the outlet through the passage, a pipe connected with the outlet and leading to the coffee compartment of the urn, and a pump in the pipe for forcing water from the water compartment into the coffee compartment.

8. A coffee urn comprising the combination of a casing, a partition therein forming a water compartment and a coffee compartment, a block mounted in the wall of the casing and having a plurality of inlet openings, a plurality of pipes connected with these inlet openings and having their open ends located at different heights in the water compartment, a stem rotatably mounted in the block and having a passage therethrough, this stem extending through the wall of the casing, a housing mounted on the outer end of the stem having an outlet, means operable from the exterior of the casing for connecting a selected inlet with the outlet through the passage, a pump connected with the outlet, and a pipe connected with the discharge opening of the pump and leading to the coffee compartment of the urn.

In testimony whereof I affix my signature.

VICTOR LAMBERT.